United States Patent [19]

Morioka

[11] Patent Number: 5,090,826
[45] Date of Patent: Feb. 25, 1992

[54] PRINTING WITH AUTOMATIC ON PAGE TEXT REPLACEMENT WITHOUT CHANGING MEMORY

[75] Inventor: Hirohito Morioka, Sakurai, Japan
[73] Assignee: Sharp Kabushiki Kaisha, Osaka, Japan
[21] Appl. No.: 394,019
[22] Filed: Aug. 15, 1989
[30] Foreign Application Priority Data

Aug. 26, 1988 [JP] Japan .................................. 63-212756

[51] Int. Cl.$^5$ .............................. B41J 5/30; B41J 29/26
[52] U.S. Cl. ........................................ 400/63; 400/695
[58] Field of Search ..................... 400/63, 74, 695-697

[56] References Cited

U.S. PATENT DOCUMENTS 4,136,395  1/1979  Kolpek ................................... 400/63
4,907,173  3/1990  Yamada ................................. 400/63

*Primary Examiner*—David A. Wiecking
*Assistant Examiner*—Steven S. Kelley
*Attorney, Agent, or Firm*—Cohen, Pontani & Lieberman

[57] ABSTRACT

A method of printing with an automatic replacement includes the steps of specifying a memory; setting a sheet of paper on which a character group stored in the memory specified has been printed, to a printer having a carrier; inputting a search text and a replacement text and storing them; retrieving the character group from the head of characters to the end one character after another to recognize whether the character group has an element identical with the search text; calculating a position on said printed sheet each time the retrieving is performed; moving the carrier to the position calculated when the character group has an element identical with the search text; erasing a part where the element identical with the search text is printed on the printed sheet; and printing the replacement text in a blank from which the element has been erased without changing the contents of the memory.

6 Claims, 3 Drawing Sheets

PRINTING WITH AUTOMATIC ON PAGE TEXT REPLACEMENT WITHOUT CHANGING MEMORY

BACKGROUND OF THE INVENTION

1. Field of the Invention

The present invention relates to a method, in a printer of an electronic typewriter, word processor or the like, for replacing a search text of specific words, symbols, sentences and the like in the contents stored in memory to be printed, or the search text printed on a sheet of paper with a replacement text of other words and the like and then printing it.

2. Description of the Prior Art

Conventionally, there are three ways of conducting such replacement in an electronic typewriter; (1) setting a sheet of printed paper, manually moving a carrier to a word to be replaced, erasing the word and printing a correct word in the blank, and performing this procedure for every word to be corrected; (2) marking in advance a part to be replaced in a document, replacing only the part and printing correctly; (3) correcting the contents stored in a memory by conducting the replacement operation, thereafter converting the operation mode to a printing mode and printing the whole of the document.

On the other hand, since a word processor has no correction (erasing) function, replacement for printed sheet can not be conducted. Instead, the contents stored in a memory are displayed with a CRT display, and manual replacement is performed on the CRT display screen (see Japanese Patent Publication No. 147772/1980).

With regard to the way explained in (1), however, when correction of a misspelling or modification of a numeral, word, person's name or the like in a document is required, the carrier must be manually moved to the erroneous parts of the document on a printed sheet one after another to correct or modify the parts by inputting a replacement text each time. If many parts should be corrected in word and the like, the operation is complicated and requires much labor, and additionally there is the possibility that an operator may carelessly leave some part or other unchanged or conduct an erroneous operation. With regard to the way explained in (2), problems similar to those in the above way (1) are caused because each part to be corrected in the document must be marked. Further, with regard to the way (3) and the word processor, the contents stored in the memory themselves are replaced with correct ones, and therefore the corrected contents stored in the memory have to be modified again if the original document must be printed.

SUMMARY OF THE INVENTION

Accordingly, it is an object of the present invention to provide a method of printing with automatic replacement, in which a search text to be corrected and a correct replacement text are simply inputted so that a erroneous word or the like on a printed sheet can be automatically erased and printed again, or a printing operation is proceeded with the search text being replaced with the replacement text, keeping the contents stored in a memory unchanged.

A method of printing with an automatic replacement according to the present invention comprises the steps of specifying a memory; setting a sheet of paper on which a character group stored in the memory specified has been printed, to a printer having a carrier; inputting a search text and a replacement text and storing them; retrieving the character group from the head or end of characters one character after another to recognize whether the character group has an element identical with the search text; calculating a position on said printed sheet each time the retrieving is performed; moving the carrier to the position calculated when the character group has an element identical with the search text; erasing a part where the element identical with the search text is printed on the printed sheet; and printing the replacement text in a blank from which the element has been erased.

To perform a replacement operation when the document is printed, a method of printing with an automatic replacement according to the present invention comprises the steps of specifying a memory; setting a sheet of paper for printing a character group stored in the memory specified, to a printer having a carrier; inputting a search text and a replacement text and storing them; retrieving the character group from the head of characters one character after another to recognize whether the character group has an element identical with the search text; calculating a position on said printed sheet each time the retrieving is performed; printing the character group from the head of characters; moving the carrier to the position calculated when the character group has an element identical with the search text while the printing is performed; and printing the replacement text instead of the element identical with the search text in a part for printing the element identical with the search text on the sheet, when the carrier is moved to the position calculated.

In the method of printing with an automatic replacement thus constructed, when replacement is performed with regard to the printed sheet, the sheet is set in position, and a memory in which a document printed in the sheet is stored is specified with an ID number or a title. After a search text of a character or word to be corrected and a correct replacement text are inputted, an execution command is inputted. Because of this operation, a preprogrammed process is performed. The contents stored in the specified memory is retrieved from the head or end of the contents one character after another to recognize whether the contents includes an element identical with the search text. When it includes the identical element, its position on the printed sheet is calculated and the carrier is moved to the position. Also, characters printed in a part corresponding to the position indicated by the carrier are erased, and the replacement text is printed in a blank from which the characters have been erased. A sequence of the operations, that is, retrieving the element identical with the search text, calculating a position of the element on the sheet, moving the carrier to the calculated position, erasing characters on the sheet and printing the replacement text, are repeated to the end or head of the contents stored in the memory, whereby words or the like to be corrected in the document are automatically replaced with correct words or the like. Therefore, rapid replacement can be performed without any complicated operation, and there is no possibility that an operator may carelessly leave some part or other to be corrected unchanged or conduct an erroneous operation.

In the case that replacement is done while a printing operation is performed, a position of a word identical with the search text is calculated with regard to a printed sheet through an operation similar to the above. When printing is proceeded to the calculated position, the replacement text is printed keeping the contents stored in the memory unchanged. Thus, words or the like to be corrected in the whole document are replaced with correct words or the like, and the correct words or the like are printed, keeping the contents stored in the memory unchanged.

DESCRIPTION OF THE PREFERRED EMBODIMENT

In this description, "a character group string" means data such as a sentence including a word or formula consisting of one or more characters. "A carrier" means, for example, a carriage in a typewriter for moving a sheet of paper relatively to a printing head, or an assembling unit in a carriage fixed typewriter for moving a printing head relatively to a sheet of paper. Further, "a printer having a carrier" means a printer in which a printing head can be moved relatively to a sheet of paper as mentioned above. Such a printer is advantageously applied to an electronic typewriter, for example. Furthermore, "a search text" means a character, character string or character strings to be searched, and "a replacement text" means a character, character string or character strings to be replaced.

Now a preferred embodiment of the present invention will be described in conjunction with accompanying drawings.

Figure 1:
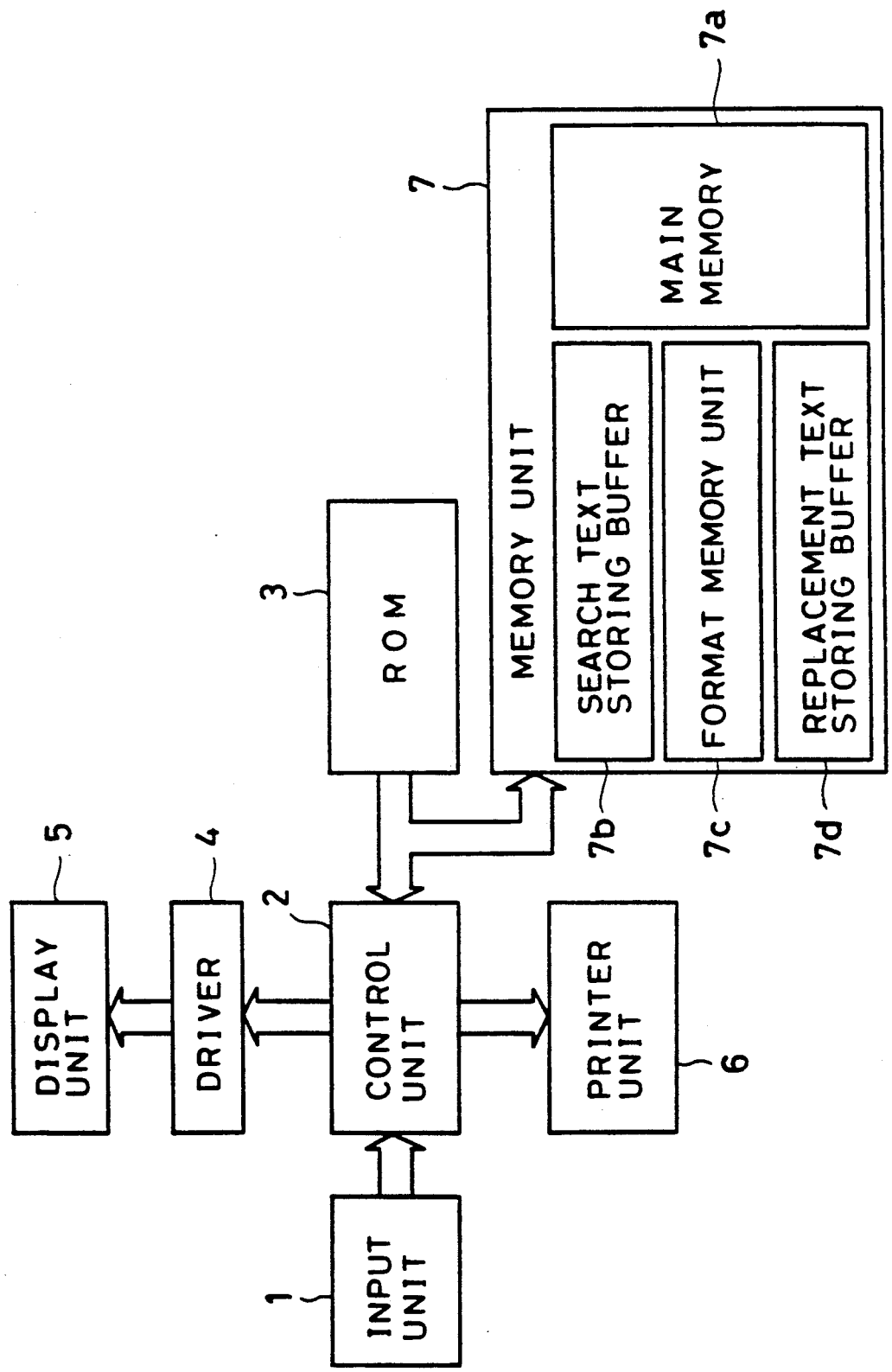
FIG. 1 is a block diagram showing an architecture of an embodiment of a printing device concerned with the present invention.

FIG. 1 is a block diagram showing an architecture of a printing device to which a printing method according to the present invention is applied. An input unit 1, used for interactive input with the printing device, comprises alphabet keys, command keys, ten keys and the like. A control unit 2, including a microcomputer and the like, processes various signals based upon a control program stored in a ROM 3 for character information inputted from the input unit 1, makes a display unit 5 of a CRT or the like display the character information through a driver circuit 4 and controls a printer unit 6 having a carrier K (not shown) to print the character information on a recording paper. A memory unit 7 is formed of a RAM capable of reading and writing and divided into four sections; a main memory 7a for storing document information which is inputted from the input unit 1 and printed or should be printed by the printer unit 6, a search text storing buffer 7b for temporarily storing a word, character and the like to be corrected which is inputted from the input unit 1, a format memory unit 7c for storing various format information about a pitch (a space between characters), line space (a space between lines) and the like and for storing a table containing values by which the carrier K is displaced to print characters and which are available from the format information, and a replacement text storing buffer 7d for temporarily storing a word, character and the like to be corrected.

Then, the operation for replacing words in some part of a printed sheet with desired words in an electronic typewriter will be described in detail in conjunction with FIG. 2(a)–(f) and FIG. 3. In the case that characters "Tokyo" printed on a paper sheet P shown in FIG. 2(a) are to be corrected to "Osaka", the sheet P is first inserted to the printer unit 6 and set in position (Step S1). Then, the main memory 7a which stores the document information printed on the sheet P in the memory unit 7 is specified by inputting an identification (ID) number, a title or the like from the input unit 1 (Step S2). Thereafter, a search text of a character string "Tokyo" to be corrected and a replacement text of a correct character string "Osaka" are inputted and temporarily stored in the buffers 7b, 7d (Step S3). The operation practiced by an operator is completed with input of an execution command.

Based upon the aforementioned input data, first the initial position of the specified main memory 7a is set to a memory data read pointer (Step S4), an address in which the initial character "T" of "Tokyo", the search text in the search text storing buffer 7b, is stored is set to a search text reference pointer (Step S5), and further the value "0" is set to a horizontal carrier position calculating counter HCNT and a vertical sheet feeding amount calculating counter VCNT (Step S6).

Then, the first character (letter) of the contents stored in the specified main memory 7a is read (Step S8). Values by which the carrier K is horizontally and vertically displaced to the character are obtained with reference to the table containing displacement amounts, and the displacement values are added to the aforementioned values set in the carrier position calculating counter HCNT and the sheet feeding amount calculating counter VCNT (Step S9). The read character is judged as to whether it is identical with "T" of the initial character of the search text (Step S10). When nonidentity is proved, the process is skipped to Step S17 and the search text reference pointer is set to the head of the search text. The memory data read pointer is moved to the second character in the main memory 7a (Step S18), and thereafter the process is returned to Step S7. The third character in the main memory 7a and the initial character "T" of the search text are read, and then it is judged whether those characters are identical or not in Step S10. Until an affirmative judgment "YES" is established in Step S10, the contents stored in the main memory 7a are read one character after another in order by repeating the reading cycle which begins with Step S7 followed by Steps S8, S9, S10, S17 and S18 and returns to Step S7. Values of horizontal and vertical displacement of the carrier K are obtained one after another with the reading operation. The values are added to values in the carrier position calculating counter HCNT and the sheet feeding amount calculating counter VCNT.

During the reading operation, when the affirmative judgment "YES" is established in Step S10 because one of the read characters is identical with the initial character "T" of the search text, the search text reference pointer is moved to the next character and an address of the search text storing buffer 7b in which "o" is stored is set thereto (Step S11). The reading cycle which begins with Step S7 followed by Steps S8, S9, S10, S11 and S18 and returns to Step S7 is repeated with regard to all the remaining characters of the search text "k", "y", "o" until at last all of the characters are identical with read characters and an affirmative judgment YES is established in Step S12. In the course of the operation, if a character which is not identical with the character of the search text is read and therefore a negative judgment NO is established in Step S10, the above reading cycle is practiced again.

Figure 2:
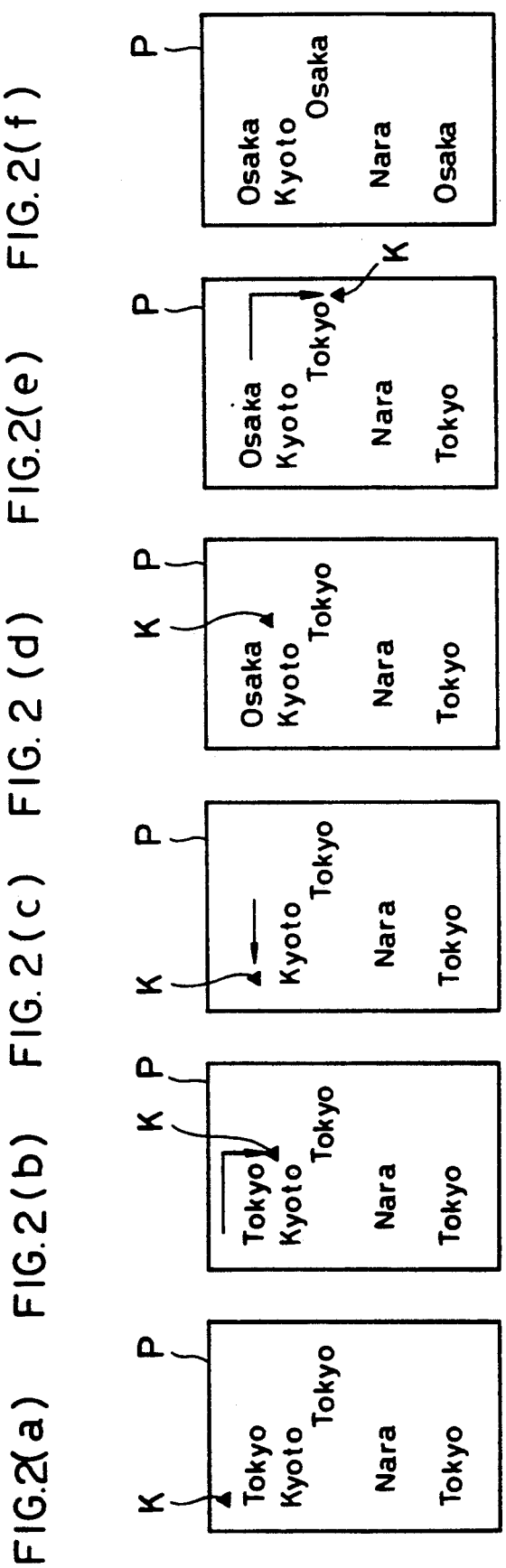
FIG. 2 is a diagram illustrating the replacement operation of the present invention.
Figure 3:
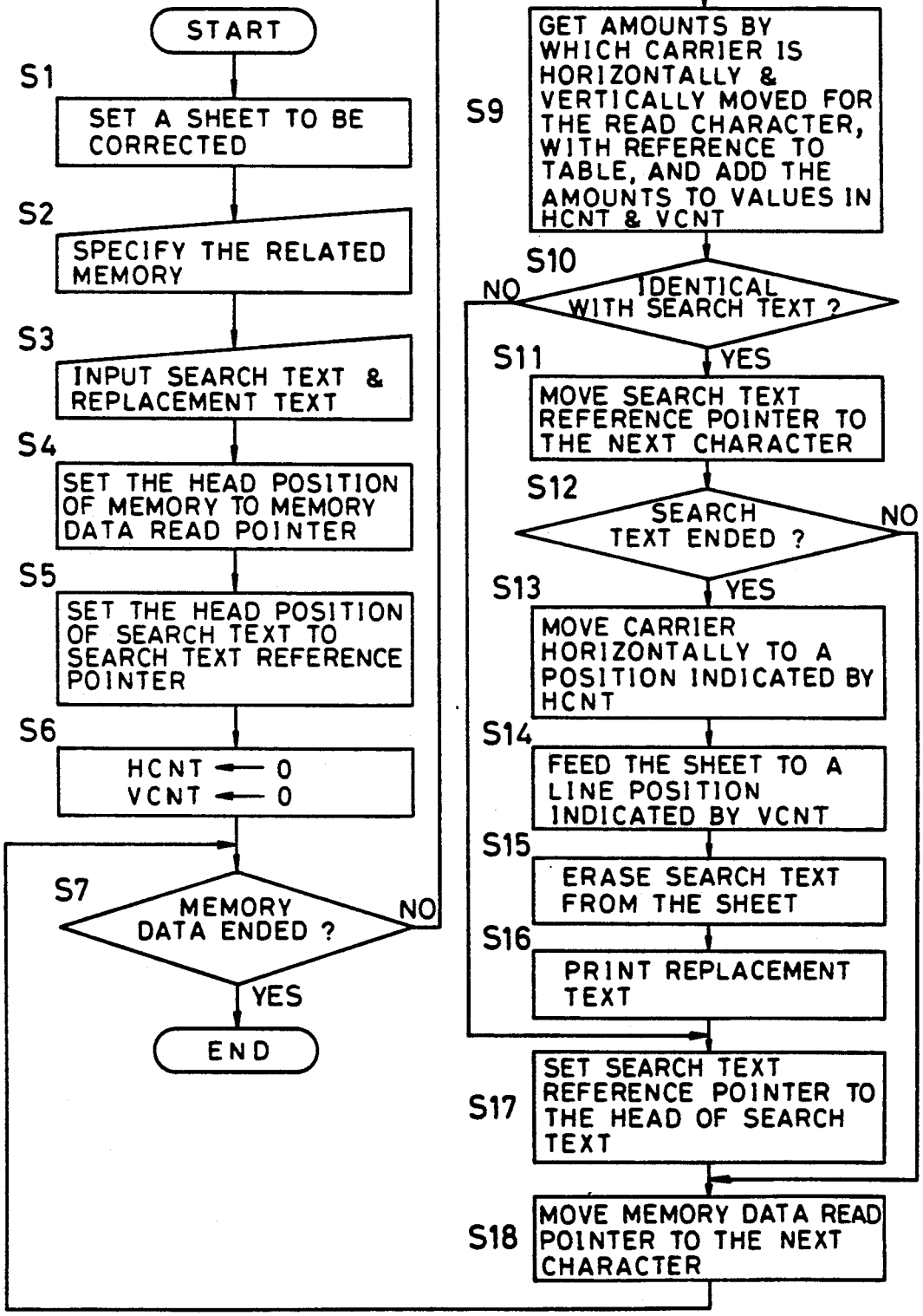
FIG. 3 is a flow chart illustrating the processing steps of the present invention.

When five successive affirmative judgments YES's are established in Step S10 because five characters "T", "o", "k", "y" and "o" are successively read and therefore it is judged in Step S12 that the search text is ended, the carrier K is horizontally moved to a position calculated based upon a count value of the carrier position calculating counter HCNT as shown in FIG. 2 (b) with an arrow (Step S13). After that, a sheet of paper is vertically moved by a feeding amount calculated based upon a count value of the sheet feeding amount calculating counter VCNT (Step S14). Thus a first search text is retrieved. The carrier K is moved to the left from the retrieving position by a distance corresponding to five characters, and the specified printed characters "Tokyo" are erased through this movement of the carrier K as shown in FIG. 2 (c) (Step S15). In the blank from which the specified characters have been erased, characters "Osaka" which is the replacement text are printed on respective specified positions through the movement of the carrier K as shown in FIG. 2 (d) (Step S16).

After that, a similar operation is repeated. For example, when a second search text is retrieved as shown in FIG. 2 (e), "Tokyo" of the search text are erased in a manner similar to the above and "Osaka" of the replacement text are printed. In this way, all search texts are erased and the replacement texts are printed in a blank from which each search text has been erased. When it is judged at last in Step S7 that reading of the memory 7a is completed, the resultant printed sheet P shown in FIG. 2 (f) is obtained with desired correction having been done. At this time, the contents stored in the main memory 7a are kept unchanged; that is, "Tokyo" remains in the main memory 7a.

In the case that replacement is done while a printing operation is performed, a position of a word identical with the search text is calculated with regard to a printed sheet through an operation similar to the above. When printing is proceeded to the calculated position, the replacement text is printed instead of the search text stored in the memory.

As has been described in detail, according to the present invention, a specified word on a printed sheet can be automatically replaced with another word and printed or a specified word of the contents stored in a memory can be automatically replaced with another word and printed keeping the contents stored in the memory unchanged, by simply inputting a search text and a replacement text. As a result, rapid correction of a document is attained without a complicated operation, and additionally there is no possibility that an operator may carelessly leave some part or other to be corrected unchanged or conduct an erroneous operation.

What is claimed is:

1. A method of printing with automatic text replacement, comprising the steps of:
    specifying a memory;
    setting a sheet of paper, on which a stored character string stored in the memory specified has been printed, into a printer having a carrier;
    inputting a search text character string into a search text storage buffer and a replacement text character string into a replacement text buffer and storing them;
    retrieving the stored character string from memory from the beginning or end of the stored character string one character after another, and comparing the retrieved character with the search text so as to recognize whether the stored character string has an element identical with the search text;
    calculating and storing a position on said printed sheet each time the retrieving is performed;
    moving the carrier to the stored position calculated when the stored character string has an element identical with the search text;
    erasing a portion of the printed sheet to create a blank space where the element identical with the search text is printed; and
    printing the replacement text in the blank space from which the element has been erased, without changing the contents of the memory.

2. The method according to claim 1, wherein the calculating step includes the step of:
    obtaining amounts by which the carrier is moved horizontally and vertically each time one character is retrieved; and
    updating a carrier position calculating counter for the horizontal displacement and a sheet feeding amount calculating counter for the vertical displacement based upon the amounts obtained by the previous step.

3. The method according to claim 1, wherein the moving step includes the steps of:
    moving the carrier horizontally to a position calculated based upon a count value in the carrier position calculating counter; and
    feeding the sheet of paper by an amount based upon a count value in the sheet feeding amount calculating counter.

4. A method of printing with automatic text replacement, comprising the steps of:
    specifying a memory;
    setting a sheet of paper for printing a stored character string stored in the memory specified, into a printer having a carrier;
    inputting a search text character string into a search text storage buffer and a replacement text character string into a replacement text storage buffer and storing them;
    retrieving the stored character string from memory from the beginning of the stored character group one character after another, and comparing the retrieved characters with the search text so as to recognize whether the stored character string has an element identical with the search text;
    calculating and storing a position on said sheet each time the retrieving is performed;
    printing the stored character string from the beginning of the stored character group;
    moving the carrier while the printing is performed to the stored position calculated when the stored character string has an element identical with the search text; and
    printing, at the position calculated, the replacement text stored in the replacement text storage buffer instead of the element in the stored character group recognized to be identical with the search text, without changing the contents of the memory.

5. The method according to claim 4, wherein the calculating step includes the step of:

obtaining amounts by which the carrier is moved horizontally and vertically each time one character is retrieved; and updating a carrier position calculating counter for the horizontal displacement and a sheet feeding amount calculating counter for the vertical displacement based upon the amounts obtained by the previous step.

6. The method according to claim 4, wherein the moving step includes the steps of:

moving the carrier horizontally to a position calculated based upon a count value in the carrier position calculating counter; and feeding the sheet of paper by an amount based upon a count value in the sheet feeding amount calculating counter.

* * * * *